(No Model.)
H. T. GILES.
EXPANSIBLE MANDREL.
No. 509,160. Patented Nov. 21, 1893.
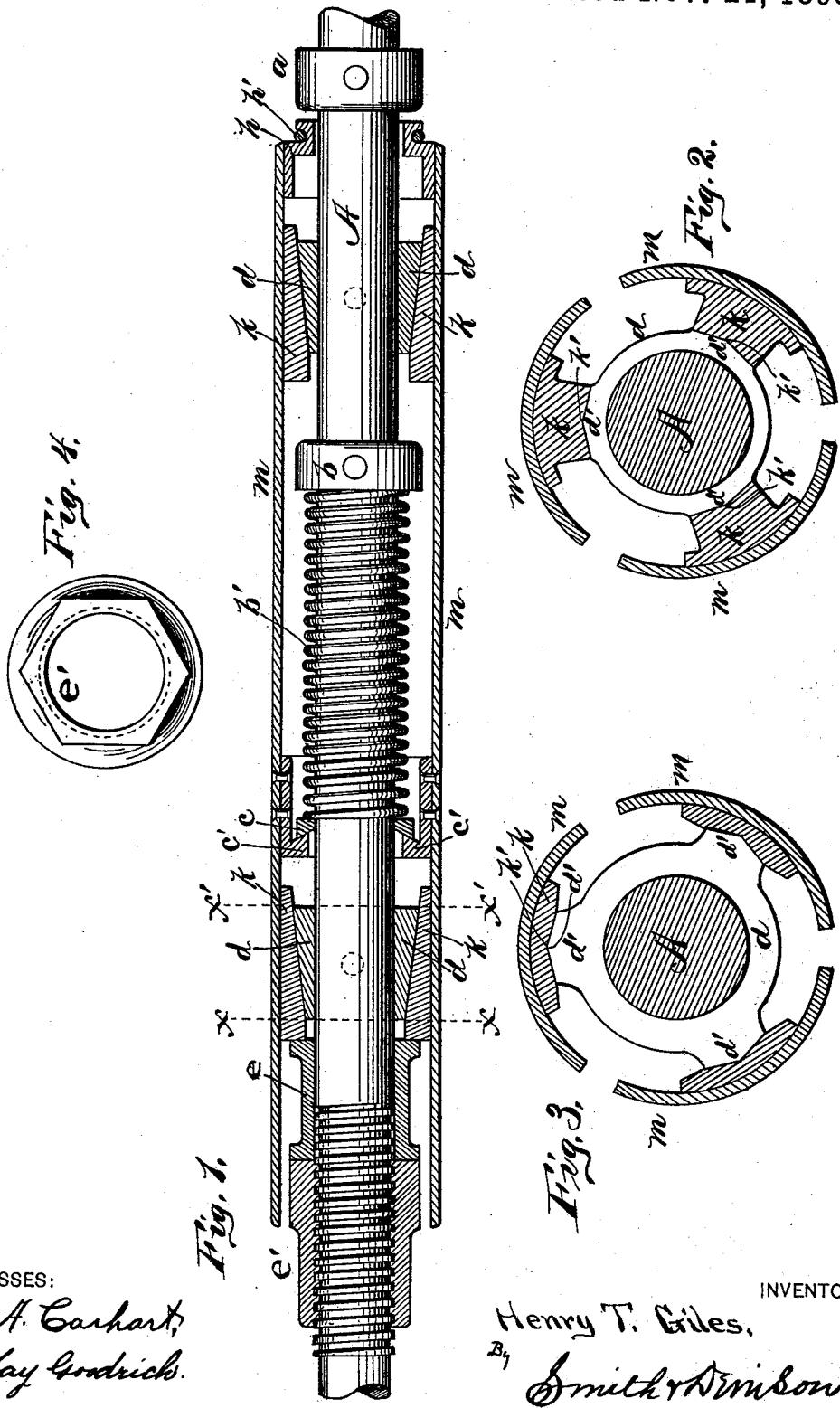
WITNESSES:
H. A. Carhart,
D. May Goodrich.
INVENTOR
Henry T. Giles,
By Smith & Denison
ATTORNEYS.

United States Patent Office.

HENRY T. GILES, OF WATERTOWN, NEW YORK, ASSIGNOR TO ALFRED D. REMINGTON, OF SAME PLACE.

EXPANSIBLE MANDREL.

SPECIFICATION forming part of Letters Patent No. 509,160, dated November 21, 1893.

Application filed March 27, 1893. Serial No. 467,687. (No model.)

*To all whom it may concern:*

Be it known that I, HENRY T. GILES, of Watertown, in the county of Jefferson, in the State of New York, have invented new and useful Improvements in Expansible Mandrels; of which the following, taken in connection with the accompanying drawings, is a full, clear, and exact description.

My invention relates to expansible mandrels, designed to be inserted into a tubular body, and, by expansion upon radial lines, to firmly grip and hold the tube, as long as desired.

My object is to produce a mandrel comprising a center shaft, conical or tapered, expansion collars thereon, expansion rails yieldingly held in position parallel to the shaft, and provided with curved and tapered wedge plates concentric with said collars and in engagement therewith, means to cause said shaft to traverse longitudinally, to expand the mandrel by forcing said rails outwardly and to contract it by the retraction of said shaft and the further effect of manufacturing paper tubing.

My invention consists in the several novel features of construction and operation hereinafter described and which are specifically set forth in the claims hereunto annexed. It is constructed as follows, reference being had to the accompanying drawings, in which—

Figure 1, is a longitudinal sectional elevation of the mandrel. Fig. 2, is a transverse section on line $x\ x$, on an enlarged scale. Fig. 3, is a like view on line $x'\ x'$. Fig. 4, is a front elevation of the operating nut upon the shaft.

A, is the main shaft provided with a stop collar —$a$—, rigidly secured thereto, with a rigidly secured collar —$b$— against which one end of the spring —$b'$— abuts; with a sliding sleeve —$c'$—; with the tapered sleeves —$d$— secured thereto; with the threaded portion as shown, upon which the adjusting nut —$e$— and the operating nut —$e'$— are mounted. Around this shaft the expanding rails —$m$— are mounted, consisting of strips of metal exteriorly and interiorly concentric with the shaft, and each rail is provided at one or both ends with a flanged and grooved arm —$h$—, and —$h'$— is a spring clasp fitting in the grooves in said plates and operating by their tension to draw said plates in, as well as to retain them in place. Each rail is also provided with the tapered wedges —$k$—, grooved interiorly and longitudinally, as at —$k'$—, to receive the projection —$d'$— upon the sleeve —$d$— which together operate to prevent any displacement of said rails; I may use three or more wedges for the purpose of giving greater strength to the spool and preventing it from collapsing, and also provided with the rigidly secured and hooked interiorly projecting arms —$c'$—, which engage with the sleeve —$c$— as shown, and operate to regulate the reciprocation of said rails and to equalize their movements, as well as to create the tension upon the spring —$b'$— and to aid in retracting said rails, to reduce the size of the mandrel.

The nut —$e$— is set or adjusted according to substantially the internal diameter of the tube, pipe or tubular winding-spool, for winding rolls of paper, or other purposes, and then when the mandrel is inserted and the nut —$e'$— is operated, the shaft and the sleeves —$c$— are moved longitudinally and the rails are wedged outwardly into close frictional connection with said tube and so that the rotation of the mandrel rotates said tube or spool. Then when the nut —$e'$— is unscrewed, the tension existing upon the spring —$b'$— will retract said rails and the clasps —$h'$— will, by their contraction, aid in retracting them and will also operate to keep them in proper relation with each other.

What I claim as my invention, and desire to secure by Letters Patent, is—

1. An expansible mandrel comprising a central shaft, tapered sleeves secured thereon, expansible rails yieldingly mounted upon said shaft, wedges within said rails engaging with said sleeves, and a nut upon said shaft engaging with one set of said wedges, in combination.

2. An expansible mandrel comprising a central shaft, tapered and centrally convex sleeves secured thereon, expansible rails yieldingly supported, wedges interiorly concave secured to and within said rails and engaging with said sleeves and a nut upon said shaft engaging with one set of said wedges, in combination.

3. An expansible mandrel comprising a central shaft, tapered and centrally convex sleeves secured thereon, expansible rails yieldingly supported, wedges interiorly concave secured to and within said rails and engaging with said sleeves, an operating nut and an adjusting nut upon said shaft bearing against one set of said wedges, in combination.

4. An expansible mandrel comprising a central shaft, tapered and convex sleeves thereon, expansible rails mounted parallel to said shaft, a spring upon said shaft, a sliding sleeve thereon bearing against said spring, arms upon said rails engaging with said sleeve, wedges interiorly convex secured upon said rails and a nut upon said shaft engaging with said wedges.

In witness whereof I have hereunto set my hand this 21st day of March, 1893.

HENRY T. GILES.

In presence of—
C. W. SMITH,
HOWARD P. DENISON.